Jan. 12, 1932. W. J. BROWN 1,840,764
SPUT AND METHOD OF CONNECTING IT TO A SHEET
Filed Feb. 28, 1929

INVENTOR
William J. Brown
BY
Gifford, Scull & Burgess
ATTORNEYS

Patented Jan. 12, 1932

1,840,764

UNITED STATES PATENT OFFICE

WILLIAM J. BROWN, OF IRVINGTON, NEW JERSEY, ASSIGNOR TO THE NATIONAL LOCK WASHER COMPANY, OF NEWARK, NEW JERSEY, A CORPORATION OF NEW JERSEY

SPUT AND METHOD OF CONNECTING IT TO A SHEET

Application filed February 28, 1929. Serial No. 343,460.

This invention relates to a novel and improved form of sput and to the method for attaching it to a sheet. The invention will be best understood from the following description and the annexed drawing, in which I have shown a selected embodiment of the invention and in which Fig. 1 is a view looking from the bottom of Fig. 2 and showing the novel form of sput before attachment to a sheet.

In the description and claims, the word "sheet" will be used to refer to any thin piece of material to which a sput may be attached. Usually, this piece of material is the sheet of a drum or barrel, although the invention is not necessarily limited to use with such containers.

Figure 1:
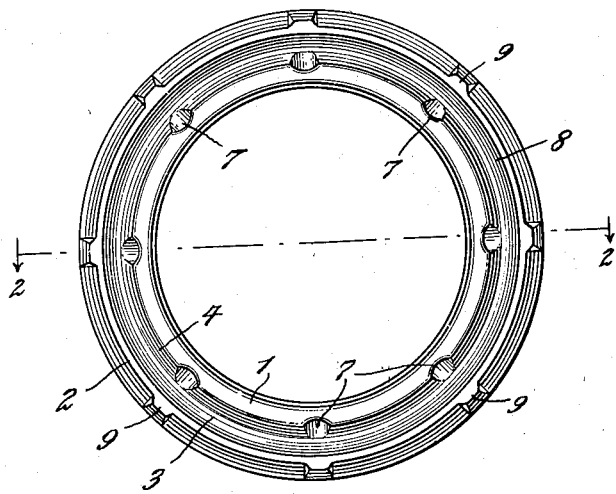
Figure 2:
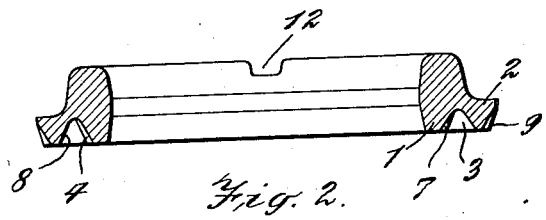
Fig. 2 is a section on the line 2—2 of Fig. 1.
Figure 3:
Fig. 3 is a view corresponding to Fig. 2 but showing the sput attached to a sheet.

Referring first to Figs. 1 and 2, it will be seen that the sput is in the form of an annular ring formed of an inner portion 1 and an outer portion 2 separated by a groove 3. One of these portions is made bendable towards the other, in this form the outer portion 2 being constructed so as to be capable of being thus bent towards the portion 1. It will be seen that the groove, as it appears in these figures, is in the form of a V with both sides thereof sloping with respect to the axis of the ring. The side or wall 4 of the groove is inclined outwardly from this axis and is adapted to receive the bent back lip 5 surrounding an opening in the sheet 6, as shown in Fig. 3.

It has been known, in prior art constructions, to form the opposite walls of the groove 3 in the form of mating projections and recesses, so that when the two walls were brought into contact with the lip of the sheet, the result would be a deformation of the sheet between these mating projections and recesses. According to my invention, however, I provide one wall of the groove, here shown as the inner wall 4, with a plurality of recesses 7, while the opposite wall 8 of the groove is substantially smooth. On the outer portion 2, on the side away from the groove, is a plurality of projections 9 which form an added thickness of metal opposite each recess 7.

When the parts are assembled, the bent back lip 5 of the sheet is inserted in the groove in contact with the wall 4 thereof. Then, by a suitable pressing operation, the parts are brought to the position shown in Fig. 3, the added metal in the projections 9 causing the lip to bend into the corresponding recesses. When the operation is completed, the outer surface 10 of the outer portion 2 is uniform and regular in appearance, the projections having flowed inwardly and caused the metal of the lip to be forced into the corresponding recesses. The usual threads 11 may be formed in the sput for the purpose of securing a plug therein. The top of the sput may also be provided with one or more of the usual recesses 12 which are used for locking the plug in position.

I claim:—

1. The method of connecting a sput to a lip surrounding an opening in a sheet which comprises forming in the sput a groove adapted to receive the lip, with a plurality of spaced smooth recesses in one side of the groove and with the other side smooth, pressing both sides of the groove into engagement with the lip, and shaping the lip into said recesses.

2. The method of connecting a sput to a lip surrounding an opening in a sheet which comprises forming in the sput a groove adapted to receive the lip, with recesses in one side of the groove and the other side smooth, but with an added thickness of metal opposite said recesses, bringing both sides of the groove into engagement with the lip, and causing the metal at the points of added thickness to press the lip into said recesses.

3. The method of connecting a sput to a lip surrounding an opening in a sheet which comprises forming in the sput a groove adapted to receive the lip and separating inner and outer portions of the sput, with a plurality of recesses in the inner portion opening into the groove, and with the outer portion having an added thickness of metal opposite said recesses, pressing said outer portion inwardly into engagement with the lip and the lip into engagement with the inner portion, and causing said metal at the points of added thickness to force the lip into said recesses.

4. In combination, a sheet having an opening therein surrounded by a lip, and a sput for said opening having a hole for the reception of a plug, said sput comprising inner and outer portions separated by a groove in which said lip is disposed, one of said portions having recesses opening into the groove and the other having an added thickness of metal opposite the recesses, and said portions engaging opposite sides of the lip to hold it in the groove.

5. In combination, a sheet having an opening therein surrounded by a lip, and a sput for said opening having a hole for the reception of a plug, said sput comprising inner and outer portions separated by a groove in which said lip is disposed, one of said portions having recesses opening into the groove and the other having an added thickness of metal opposite the recesses and on the side away from the groove, and said portions engaging opposite sides of the lip to hold it in the groove.

6. A sput having an annular groove adapted to receive a lip surrounding an opening in a sheet and separating inner and outer portions, one bendable towards the other, one of said portions having recesses opening into the groove and the other having an added thickness of metal opposite said recesses.

7. A sput having an annular groove adapted to receive a lip surrounding an opening in a sheet and separating inner and outer portions, with the outer portion bendable towards the inner portion, said inner portion having recesses opening into the groove and the outer portion having projections on the side away from the groove and disposed opposite said recesses.

8. The method of connecting a sput to a lip surrounding an opening in a sheet which comprises forming in the sput a groove adapted to receive the lip, with added thicknesses of metal on one side of the groove at points spaced around the groove, and forcing both sides of the groove into engagement with the lip, whereby an additional pressure will be exerted against the lip at said points.

WILLIAM J. BROWN.